Nov. 6, 1956  H. G. EDMONDS, SR  2,769,658
COMBINATION CONVERTIBLE TOP AND EXPANSIBLE VEHICLE BODY
Filed Sept. 8, 1953  4 Sheets-Sheet 1

HARRY G. EDMONDS SR
INVENTOR.

BY *James L. Givnan*
ATT'Y

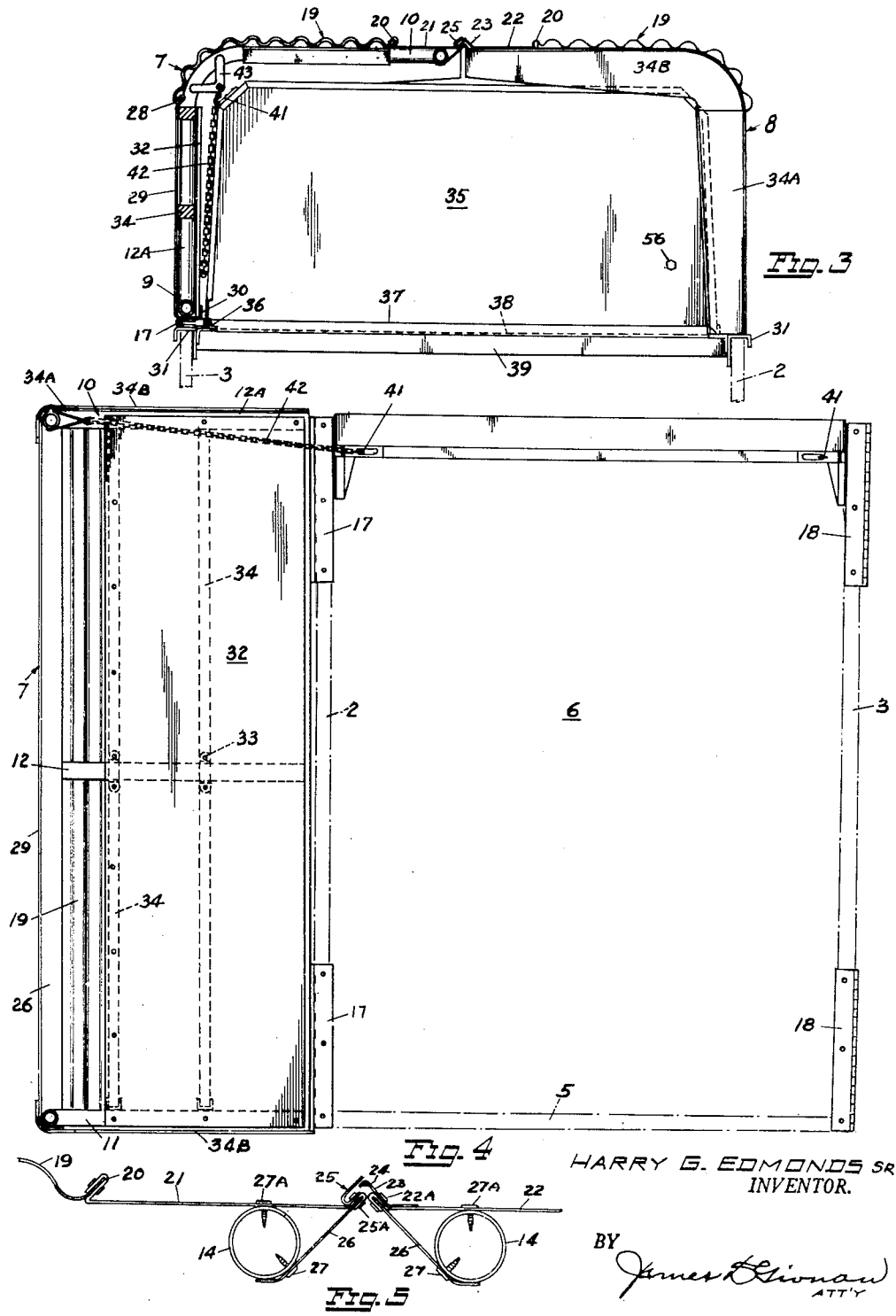

Nov. 6, 1956    H. G. EDMONDS, SR    2,769,658
COMBINATION CONVERTIBLE TOP AND EXPANSIBLE VEHICLE BODY
Filed Sept. 8, 1953    4 Sheets-Sheet 3
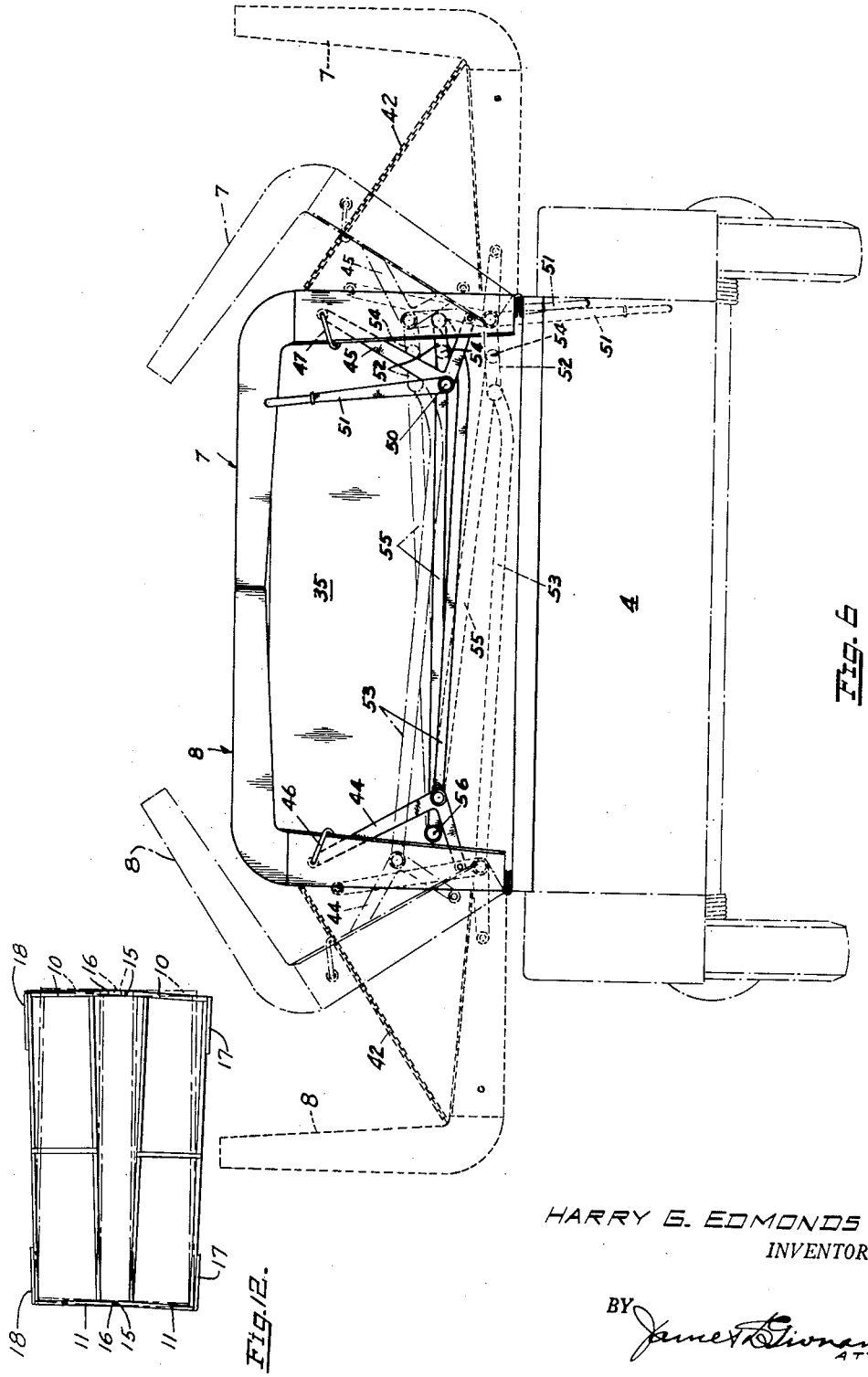
HARRY G. EDMONDS SR.
INVENTOR.
BY Nov. 6, 1956  H. G. EDMONDS, SR  2,769,658
COMBINATION CONVERTIBLE TOP AND EXPANSIBLE VEHICLE BODY
Filed Sept. 8, 1953  4 Sheets-Sheet 4
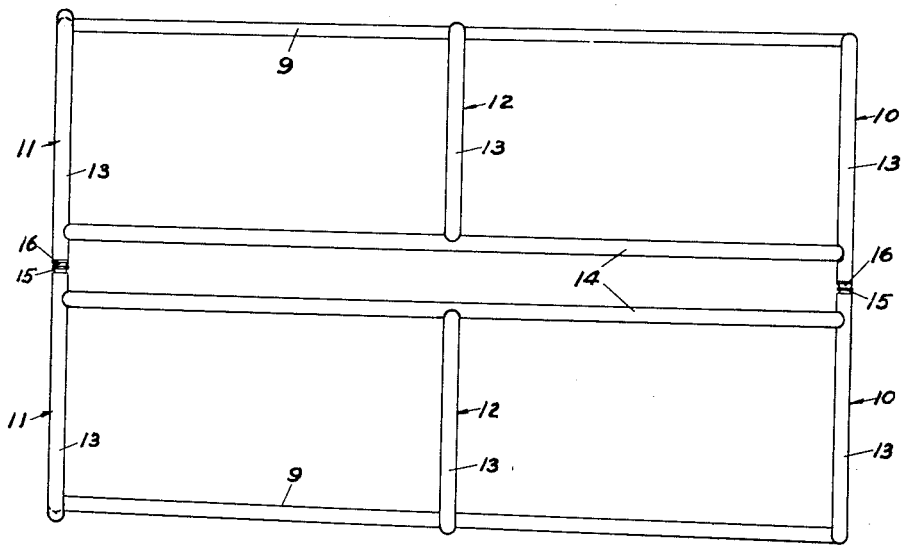
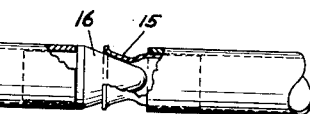
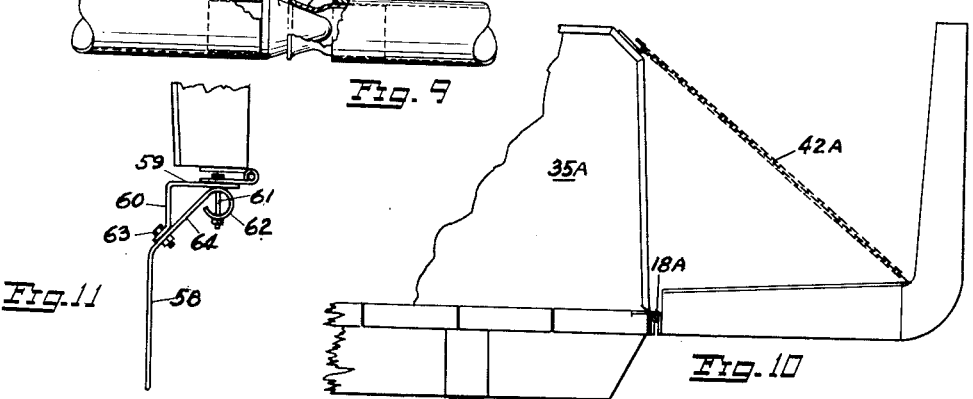
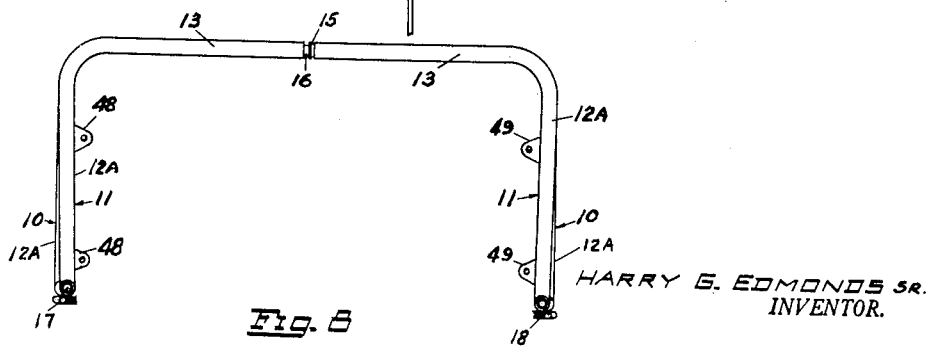
HARRY G. EDMONDS SR.
INVENTOR.
BY
James L. Leiman
ATT'Y

United States Patent Office 2,769,658
Patented Nov. 6, 1956

2,769,658

COMBINATION CONVERTIBLE TOP AND EXPANSIBLE VEHICLE BODY

Harry G. Edmonds, Sr., Oregon City, Oreg., assignor to National Weather-Top Corporation, Tacoma, Wash.

Application September 8, 1953, Serial No. 379,026

3 Claims. (Cl. 296—100)

This invention relates generally to vehicle bodies and has for one of its principal objects to provide a body divided throughout its length into two sections readily adaptable to a wide range of sizes and types of vehicles and which can be quickly and conveniently opened to facilitate loading the vehicle and closed to protect the load and locked in a closed position.

A further object of the invention is the provision of a body of this character which is readily convertible by the manipulation of a single lever from a closed and locked panel type to a partially open arrangement for convenient loading or increasing its volumetric capacity in transit. Means are also included for further and fully opening the body sections to a position where the side sections become horizontal to provide increased useful platform area for the support of cargo and various other uses.

With the foregoing and other objects and advantages in view, it will become apparent as the description proceeds that the invention consists essentially in the novel combination and arrangement of parts hereinafter described in detail and illustrated in the accompanying drawings.

In the drawings:

Figure 1 is a side view of the invention shown applied to a vehicle, which may be a trailer, a truck, or the like.

Figure 3 is a sectional end view taken approximately along the line 3—3 of Figure 2.

Figure 4 is a top plan view of one section of the body in full open position with respect to the vehicle and with the other section removed.

Figure 5 is a detail view of a mechanical seal for the top portions of the sections when in a closed position.

Figure 6 is an enlarged front view of the invention shown in closed, partially open, and fully open positions.

Figure 7 is a top plan view of the frame members of the sections shown in a closed position.

Figure 8 is a view of Figure 7 from the left-hand end thereof.

Figure 9 is an enlarged detail view of a coupling for the interconnecting inner ends of the front and rear elements of the frame members when in a closed position.

Figure 10 is a fragmentary end view of a vehicle body of the flat bed or platform type showing the invention operatively applied thereto.

Figure 11 is a detail view of an adapter for applying the invention to a vehicle having flare boards along its sides.

Figure 12 is a slightly exaggerated diagrammatic view on a reduced scale illustrating the manner in which certain of the elements of the frame members of Figure 7 are sprung into engagement with each other.

Figure 1:
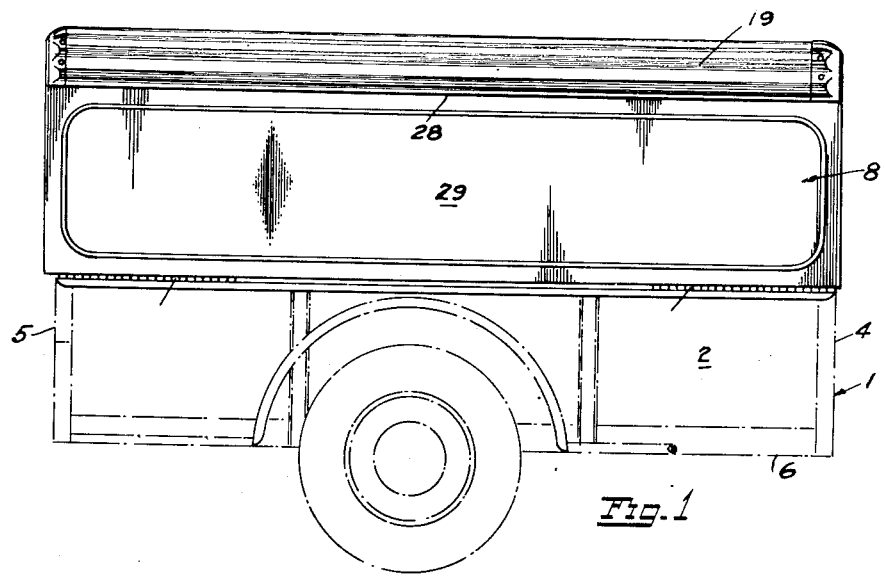
Figure 2:
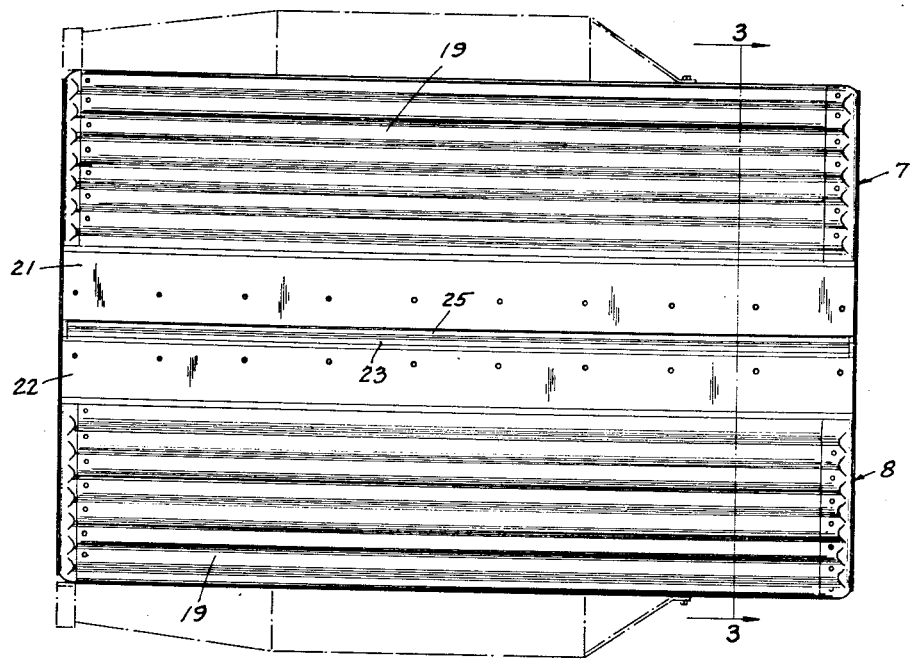
Figure 2 is a top plan view of Figure 1.

Referring more particularly to the drawings:

Reference numeral 1 indicates generally a vehicle box or open body shown in broken lines and which, though not necessarily, may be that of a trailer, truck or the like, and made up of side walls 2 and 3, a front wall 4, and a rear wall or tail gate 5, all secured and attached to the bed or platform 6 of the vehicle in the conventional manner.

My new and improved vehicle body comprises two right and left identical sections indicated generally at 7 and 8, and since they are identical, a description of one will suffice for both.

Each section is made up of a primary frame (see Figures 7 and 8) comprising a longitudinal member 9 having secured to it by welding or the like front, rear, and intermediate frame elements 10, 11 and 12, respectively, which, as best shown in Figure 8, are formed into upright portions 12A and horizontal portions 13. The inner end of the element 12 and the inner end portions of the elements 10 and 11 are interconnected by and preferably welded to a horizontal member 14. As will become apparent in the further description of the invention, all of said elements 9, 10, 11 and 14 may be, and preferably are, made of rigid light weight seamless metal tubing. The inner ends of the elements 10 and 11 in one frame section are provided with sockets 15 flared outwardly as shown to receive conical plugs 16 carried by the inner ends of the corresponding elements in the companion frame section to firmly unite said frame elements into a rigid and aligned unit when the frame is in a closed position.

In the particular adaptation of the invention herein shown and described the frame sections are hingedly attached to the forward and rearward top end portions of the side walls 2 and 3 of the vehicle body by two pairs of hinges indicated at 17 and 18 which are secured to the longitudinal members 9 of the frame and also to channel irons 31 embracing and secured to the top edge of the side walls of the vehicle. It is to be understood, of course, that this particular mounting does not prescribe any limits of utility of the invention since obviously it is readily adaptable to any desired type of hinged mounting or other support which need not necessarily be a vehicle. As best illustrated in Figures 4, 8, and 12, the hinges 17—17 and 18—18 are in fore and aft alignment with each other but are not parallel to the longitudinal centerline of the vehicle or its sides. In other words, the hinge lines converge from the front to the rear of the vehicle so that when both frame sections are drawn together toward a closed position the inner ends of the rear frame elements 11 will come into engagement with each other first (see Figures 7 and 8) and thereafter both frame sections will be progressively sprung inwardly (as shown in broken lines in Figure 12) to unite the inner ends of the forward elements 10 into secure and aligned engagement with each other and so held by an actuating and locking mechanism to be hereinafter described which will also have the effect of holding the rear elements 11 together through sprung torsional pressure. It is to be understood, of course, that the hinge lines could be arranged parallel to each other if desired.

The top of each frame section is preferably covered with corrugated sheet metal 19 whose inner opposing edges are united as at 20 with the outside marginal edges of elongated panels 21—22 extending the full length of the frame. Secured as at 22A throughout the length of the inner edge of the panel 22 (see Figure 5) is a flange turned upwardly and downwardly as at 23 and 24. The downwardly turned portion 24 underlies one leg of a U-shaped member 25 secured as at 25A throughout its length to the panel 21 to provide a drainage trough. The inner edges of the panels 21 and 22 are reinforced by diagonal bracing strips 26 extending throughout the length of the frame sections and secured by screws or the like as at 27 to the longitudinal members 14 of the frame sections to which the panels 21—22 are also secured at spaced apart intervals by screws 27A. The outer edge of each top covering is connected as at 28 to a panel or side covering 29 whose bottom edge is turned inwardly beneath the longitudinal member 9 and then upwardly with respect thereto as at 30. Although I have shown and described the top and side coverings as corrugated and flat sheet metal, it will be readily understood that any other suitable material could be used if desired. The front and rear frame elements 10 and 11 are provided with external end facings 34A and 34B which are individually secured by any suitable means to the upright and horizontal portions respectively of said frame elements. The adjacent ends of the facings overlap but are not interconnected so as to allow relative movement during any operational flexing of the frame or said frame elements. To the inside of the vertical portions 12A of the frame elements 10, 11 and 12 I secure a load-supporting panel 32 by means of pipe straps 33 embracing the vertical portions 12A of said frame elements and interconnected by stringers 34 to reinforce the panel throughout its length and width.

The forward end of the vehicle is provided with a bulkhead 35 secured at its lower corners by means of angle clips 36 to the inside leg of the channels 31 and set rearwardly from said forward end as shown in Figure 4. The bottom marginal edge of the bulkhead is secured by spot welding, bolts, or the like to an upwardly turned rear flange 37 of a plate 38 bearing upon the top surface of the front wall of the vehicle and flanged downwardly as at 39 to provide an apron or seal across the upper front surface of the wall 4. The flange 39, the bulkhead 35, and the overlapping facings 34A—34B provide a shield for the interior of the vehicle body.

The top of the bulkhead is flanged horizontally rearwardly and at its sides rearwardly on a rearward taper from top to bottom to provide a rigid structure. A space is preferably provided between the body sections and the top and sides of the bulkhead with sufficient clearance to permit the body sections to move laterally and vertically without restraint while remaining closed and to permit a limited flow of air into the body while in motion. To each top corner of the bulkhead I secure a hook element 41 or other attaching means to which is attached one end of a chain 42 whose opposite end is attached to a bracket 43 secured to the portions 13 and 12A of the forward elements 10 of the frame. As best shown in dotted lines in Figure 6, the chains will support the top sections and any reasonable load carried thereby in their fully open position without additional support along their length.

For actuating both top sections simultaneously into the positions shown in full and broken lines in Figure 6, I provide a mechanism including L-shaped brackets 44 and 45 formed at their apices with bearings, as shown. The top and bottom ends of the brackets 44—45 are attached by means of removable pins 46 and 47, respectively, which extend through brackets 48—49, respectively, secured in vertical spaced relation to the vertical portions 12A of the frame elements 10.

Rotatably mounted in the bearing in the bracket 45 is a shaft 50 to whose outer end is secured in any suitable manner an actuating lever 51. To the opposite or inner end of the shaft is secured a crank arm 52 at approximate right angles to the lever so that the lever and arm will function as a bellcrank. Interconnecting the outer end of the crank arm and the bracket 44 by means of its bearing, as aforesaid, is a link 53. Intermediate the ends of the crank arm I pivotally attach as at 54 one end of a second link 55 whose opposite end is pivotally attached to the bulkhead 35 by any approved type of bolt or pivot pin 56 extending therethrough. The link 55 maintains the symmetrical relationship between the sections 7 and 8 throughout their operative range between their closed full line position to the partially open broken line position. Both links 53 and 55 may be provided with any suitable length-adjustment means if desired. These various elements of the actuating mechanism (except the actuating lever) being arranged closely adjacent the front face of the bulkhead 35, which is set rearwardly from the front end of the side sections 7 and 8 as aforesaid, are thereby protected and sheltered by the overhanging forward end portions of the body sections as well as being protected rearwardly from damage by cargo.

From the foregoing it will be seen that movement of the lever 51 and its crank arm 52 from the full to broken line positions shown will, through the medium of the link 53, spread or swing the top sections 7 and 8 about their respective hinges into the partially open position shown in broken lines whereby the interior of the vehicle body is readily accessible for loading or unloading from the rear end or from overhead as well as providing a simple and substantial means of holding the side elements in this position against wind or motion forces when driven with a load too high to cover. For safety against accidental closing, a suitable latch or strap could be provided to hold the lever in the broken line position.

To further and fully open both top sections into the dotted line position shown it is merely necessary to withdraw the pins 46 and 47 from the top ends of their respective brackets 44 and 45 whereupon the top sections will be free to assume the full open position wherein they will be solidly supported by the chains 42, as aforesaid thereby providing added useful platform area for light and bulky cargo or extra freedom while handling cargo.

With the elements of the actuating mechanism in their full line positions shown in Figure 6, it will be apparent that the body sections 7 and 8 will be securely locked in a closed position through the medium of the right-hand end of the link 53 which is extended beyond and curved upwardly and above the horizontal center line of the shaft 50 of the actuating lever 51 and into pivotal connection with the outermost end of the crank arm 52 which end also being above the center of the shaft 50 will put the link 53 and brackets 44 and 45 under sprung tension proportional to the adjusted length of link 53 and resulting from the side elements mating in firm contact before the lever-actuated bellcrank has completed the final portion of its arc which will effectively lock sections 7 and 8 in their closed position. Having passed over the position of maximum tension link 53 bears against the underside of shaft 52 under sprung engagement therewith and so remains until lever 51 is manually rotated toward the open or broken line position. As previously pointed out, when the frame or body sections 7—8 are being drawn toward a closed position the rear elements 11 will engage with each other first by means of the self-centering and aligning elements 15—16 and thereafter upon further movement of the actuating lever 51 toward the closed position the sections will be progressively sprung inwardly to similarly unite the forward frame elements 10. The two sections 7—8 are thus brought and locked into a firm union throughout their length.

In the modification of the invention shown in Figure 10 both body sections, bulkhead 35A, and chain supports 42A are identical with those shown in the preferred form but attached to the side edges of a flat bed or platform type of vehicle instead of to the side walls of a box-type body.

The support shown in Figure 11 for operatively engaging the invention to the flare boards 58 of a truck body comprises a metallic strip having a horizontal portion 59 and a vertical portion 60. The horizontal portion is secured as at 61 to the rolled-under top edge 62 of the flare board and the vertical portion is secured as at 63 to the angular portion 64 of the flare board. By changing the cross-sectional dimensions and/or angularity of both portions, the support is rendered adaptable to a wide range of types and shapes of truck bodies.

While I have shown particular forms of embodiment of my invention I am aware that many minor changes therein will readily suggest themselves to others skilled in the art without departing from the spirit and scope of the invention. Having thus described my invention what I claim as new and desire to protect by Letters Patent is:

1. Actuating mechanism for opening and closing two sections of a body hingedly attached to a support, said mechanism comprising in combination a unitary lever and crank arm pivotally attached to one of said sections, a link pivotally attached at one of its ends to one end of said crank arm above, and curved beneath, said pivotal attachment of the lever and crank arm and pivotally attached at its opposite end to the other of said sections, a second link pivotally attached at one of its ends to said crank arm and at its opposite end to said support whereby movement of the lever and crank arm in one direction through the medium of the first mentioned link will swing said sections from a closed to an open position and in symmetrical relationship to each other through the medium of said second link, and whereby movement of the lever and crank arm in an opposite direction will similarly swing the sections into a closed position and lock them in a closed position by the over center tension of the first mentioned link.

2. A body of the character described comprising in combination two sections of inverted L-shape in cross-section hingedly attached at their sides to a support along lines diverging toward one end of the body, a wall carried by the support at said one end of the body and embraced by said sections when in a closed position, actuating mechanism for opening and closing said sections, said mechanism comprising in combination a unitary lever and crank arm pivotally attached to one of said sections, a link pivotally attached at one of its ends to one end of said crank arm above, and curved beneath, said pivotal attachment of the lever and crank arm and pivotally attached at its opposite end to the other of said sections, a second link pivotally attached at one of its ends to said crank arm and at its opposite end to said wall whereby movement of the lever and crank arm in one direction through the medium of the first mentioned link will swing said sections from a closed to an open position and in symmetrical relationship to each other through the medium of said second link, and whereby movement of the lever and crank arm in an opposite direction will similarly swing the sections together into sprung engagement with each other into a closed position and lock them in a closed position by the over center tension of the first mentioned link.

3. A body of the character described comprising in combination two sections of inverted L-shape in cross-section hingedly attached at their sides to a support along lines diverging toward one end of the body, a wall carried by the support at said one end of the body and embraced by said sections when in a closed position, actuating mechanism for opening and closing said sections, said mechanism comprising in combination a unitary lever and crank arm pivotally attached to one of said sections, a link pivotally attached at one of its ends to one end of said crank arm above, and curved beneath, said pivotal attachment of the lever and crank arm and pivotally attached at its opposite end to the other of said sections, a second link pivotally attached at one of its ends to said crank arm and at its opposite end to said wall whereby movement of the lever and crank arm in one direction through the medium of the first mentioned link will swing said sections from a closed to an open position and in symmetrical relationship to each other through the medium of said second link, and whereby movement of the lever and crank arm in an opposite direction will similarly swing the sections together into sprung engagement with each other into a closed position and lock them in a closed position by the over center tension of the first mentioned link, and means for detaching said sections from said lever-actuating means to enable the sections to be swung into fully open positions wherein the side portions of said sections will lie in a horizontal plane.

References Cited in the file of this patent

UNITED STATES PATENTS

| 296,809 | Wyman | Apr. 15, 1884 |
| 1,410,901 | Elder | Mar. 28, 1922 |
| 1,805,017 | Scott | May 12, 1931 |
| 2,433,158 | Reid | Dec. 23, 1947 |

FOREIGN PATENTS

| 334,683 | Great Britain | Sept. 11, 1930 |